United States Patent
Lee et al.

(10) Patent No.: US 6,329,032 B1
(45) Date of Patent: Dec. 11, 2001

(54) THERMOPLASTIC COMPOSITION AND CONTAINERS FOR PROMOTING PLANT ROOT BRANCHING

(75) Inventors: Victor Lee, New Philadelphia; Ed Wykoff, Massillon, both of OH (US); Mark Crawford, Valdosta, GA (US)

(73) Assignees: ICC Industries, Inc., New York, NY (US); Griffin LLC, Valdosta, GA (US)

( * ) Notice: Subject to any disclaimer, the term of this patent is extended or adjusted under 35 U.S.C. 154(b) by 0 days.

(21) Appl. No.: 09/637,332

(22) Filed: Aug. 10, 2000

Related U.S. Application Data

(63) Continuation of application No. 08/965,970, filed on Nov. 7, 1997, now Pat. No. 6,114,431.

(51) Int. Cl.[7] ............................ B29D 22/00; B29D 23/00; B32B 1/08; B65D 65/40
(52) U.S. Cl. ..................... 428/36.6; 428/35.2; 428/35.4; 428/483; 428/516; 428/518; 428/520; 428/36.5; 428/35.8
(58) Field of Search .................... 428/35.2, 35.4, 428/35.8, 483, 516, 518, 520, 36.5, 36.6; 523/123; 524/440, 435, 431, 13, 15, 16, 47, 35

(56) References Cited

U.S. PATENT DOCUMENTS

| | | |
|---|---|---|
| 2,202,664 | 5/1940 | Leatherman . |
| 3,842,537 | 10/1974 | Bishop . |
| 3,844,987 | 10/1974 | Clendinning . |
| 3,850,862 | 11/1974 | Clendinning . |
| 3,852,913 | 12/1974 | Clendinning . |
| 3,867,324 * | 2/1975 | Clendinning et al. ............. 260/23 H |
| 3,901,838 | 8/1975 | Clendinning . |
| 3,919,163 | 11/1975 | Clendinning . |
| 3,921,333 | 11/1975 | Clendinning . |
| 3,923,729 | 12/1975 | Clendinning . |
| 3,929,937 | 12/1975 | Clendinning . |
| 3,932,319 | 1/1976 | Clendinning . |
| 3,967,921 | 7/1976 | Haberli . |
| 4,020,200 | 4/1977 | Groszek . |
| 4,246,320 | 1/1981 | Coll-Pagagos . |
| 4,444,836 | 4/1984 | Khattab . |
| 4,562,215 | 12/1985 | Carter . |
| 4,604,525 | 8/1986 | Kitada . |
| 4,902,815 * | 2/1990 | Motegi et al. ......................... 560/45 |
| 4,966,910 | 10/1990 | Lai . |
| 5,180,575 | 1/1993 | Ha . |
| 5,213,857 | 5/1993 | Erkkila . |
| 5,575,112 | 11/1996 | Scheubel . |
| 5,814,172 | 9/1998 | Cox . |
| 5,830,937 | 11/1998 | Shalov . |

* cited by examiner

*Primary Examiner*—James J. Seidleck
*Assistant Examiner*—U. K. Rajguru
(74) *Attorney, Agent, or Firm*—John D. DeLong of Hahn, Loeser + Parks, LLP

(57) ABSTRACT

A thermoplastic composition having incorporated metal is provided in accordance with the invention. The thermoplastic composition can be processed at low temperatures, readily absorbs water, and is processable into a form suitable for use as a plant container. The thermoplastic composition and plant containers made therefrom are useful for promoting root branching in plants.

22 Claims, No Drawings

THERMOPLASTIC COMPOSITION AND CONTAINERS FOR PROMOTING PLANT ROOT BRANCHING

The present invention is a continuation of Ser. No. 08/965,970 filed Nov. 7, 1997 now U.S. Pat. No. 6,114,431.

TECHNICAL FIELD

The present invention relates generally to a water absorptive thermoplastic polymer composition including a metal biocide, wherein the composition and plant containers made therefrom are capable of promoting plant root branching.

BACKGROUND

Plants with dense, branched root systems are generally stronger, healthier, and better able to survive transplantation than plants that do not have such dense, branched root systems. However, the roots of plants grown in containers tend to grow in a straight line, without branching, and the roots develop a characteristic container-circling structure as they fill the container.

Plants with container-circling root structures are not well suited to successfully survive transplantation because the roots generally continue to grow in a restricting line pattern once the circling growth pattern is established. As a result, the root system does not grow outward from the containerized root system to properly anchor the plant and the plant does not then seek nutrition and moisture from a large enough area to support itself as it grows. Furthermore, plants having this type of circling root structure are not readily transported because the portion of the root that is in contact with the container is exposed to the high temperatures that such containers, which are generally formed of a black plastic, will reach in the sun. These high temperatures are damaging to the roots, which have limited recuperative powers due to the lack of branching.

It is known that certain copper chemicals will terminate a root's growth on contact, thereby causing the root to branch in a manner similar to that in which the trimming of a tree causes a single branch to become many branches. This is desirable in the plant nursery trade as a plant grown in a container having these type of copper chemicals will have a dense, branched root ball or system. Such a dense, branched root ball will result in a stronger, healthier plant that is better able to survive transplantation.

It is conventional practice that to promote root branching, the interior surfaces of plant containers used at nurseries are coated with paints, thermoset coatings, or other fluid materials containing copper. The coating is often applied at the nursery. However, this practice is problematic because of the exposure of nursery workers to paint sprays and the like. Government regulations restrict such exposure and these restrictions, along with the time and resources required for application, represent an excessive burden to nurseries. Prior to this invention, however, no commercially viable alternative to container surface coating has been available to nurseries.

Copper is toxic to plants, so copper available to promote plant root branching should not dissolve and leach into plant soil. Copper in the form of a water-insoluble copper salt is suitable to reduce or essentially eliminate copper toxicity. In order to be available for root growth control, the water-insoluble copper salt may be fixed in the container such that it will not significantly slough from the container, yet be sufficiently exposed such that plants roots recognize the copper. Prior art methods to fix copper in a container utilize thermoset coatings containing insoluble copper salts. These thermoset coatings generally must have good water resistance to prevent cracking and sloughing of the coating.

Incorporation of copper or other metal biocides into a thermoplastic composition is known. Growth of marine flora and fauna on submarine structures such as boats hulls and piers is inhibited using copper metal at high concentrations, wherein the copper is the major component of a thermoset or thermoplastic composition. Inclusion of copper or other metal salts in relatively low or trace concentrations in a thermoplastic imparts improved weatherability and heat resistance, and promotes environmental degradation in some thermoplastics. However, the use of copper as a copper insoluble salt incorporated into a thermoplastic composition as an effective plant root branching promoter in plant containers has not been taught.

It is desirable then to provide a thermoplastic composition comprising copper such that plant containers made using the composition will be effective in promoting plant root branching.

SUMMARY

It is an object of the invention to provide a thermoplastic composition having incorporated copper or other biocides that is effective in promoting plant root branching.

It is a further object of the invention to provide a thermoplastic composition having incorporated copper or other biocides that is effective in promoting plant root branching that can be used to manufacture plant containers.

It is another object of the invention to provide a thermoplastic composition having incorporated copper or other biocides that is effective in promoting plant root branching that can be used to manufacture plant containers that can be used in a method to regulate the growth of plant roots.

It has heretofore been difficult to provide a thermoplastic composition having copper or other biocides available to control root growth in plant containers. Typical thermoplastic compositions encapsulate the copper so completely that the copper is not available to plant roots and, therefore, the roots do not branch. By incorporating the copper into a thermoplastic composition that can be subsequently used to fabricate a plant container, the present invention obviates the need for painting or otherwise coating of a plant container to promote root branching, and avoids the consequent problems with worker exposure.

In general, a thermoplastic composition having incorporated copper or other biocides is provided in accordance with the invention. The thermoplastic composition can be processed at low temperatures, readily absorbs water, and is readily formable into a film or other sheet suitable for producing plant containers. In particular, the thermoplastic composition includes at least one thermoplastic homopolymer or copolymer and the copper is present in the form of a water-insoluble copper salt. At least one water absorptive material is also included in the thermoplastic composition. In one embodiment, the water absorptive material is a lignosulphonate salt, such as calcium or ammonium lignosulphonate. The function of the lignosulphonate is to absorb water from the growth medium in the plant container, thereby effectively swelling the thermoplastic composition and making copper, present in the disclosed concentration range, available to be recognized by plant roots in the container.

Still other objects and advantages of the invention will be apparent to one of ordinary skill in the art upon reading the specification as follows.

DESCRIPTION

It has now been found that effective promotion of plant root branching is achieved using a thermoplastic composition comprising at least one thermoplastic polymer, at least one water insoluble copper salt or other biocide, and at least one water absorptive material.

In one embodiment, the thermoplastic composition contains copper in the form of a water-insoluble copper salt, which is known to cause polymer degradation at polymer processing temperatures in excess of about 350° F. Processing temperatures in excess of 350° F. can also cause the copper salts to change to a form that is less effective at promoting root branching. The thermoplastic polymer therefore should be processable at a temperature that is low enough to prevent heat degradation of the polymer due to the presence of copper in the thermoplastic composition and to prevent change of the copper to a less effective form. In particular, suitable thermoplastic polymers should be processable at temperatures less than about 320° F., and advantageously between about 270° and about 295° F. Suitable thermoplastic polymers include but are not limited to polyethylene homopolymers such as branched low density polyethylene, and polyethylene copolymers including ethylene vinyl acetate copolymer, ethylene methyl acrylate copolymer, ethylene ethyl acrylate copolymer, and ethylene butyl acrylate copolymer, polycaprolactones, polyvinyl chloride, and polyvinylidene chloride. Any thermoplastic polymer or combination of thermoplastic polymers processable at temperatures of about 350° F. or less, into a form suitable as a plant container are included within the scope of the invention. The thermoplastic composition can contain one or more suitable thermoplastic polymers. Advantageously, the thermoplastic polymer or polymers are present in amounts ranging from about 20 to about 80 percent by weight of the thermoplastic composition.

The thermoplastic composition may contain copper in the form of a water-insoluble copper salt. Copper is toxic to plants so its presence in the plant soil should be avoided. Copper is therefore provided in the thermoplastic composition in the form of a water-insoluble copper salt that will not leach from the thermoplastic composition when in contact with moist soil or other growth medium. Suitable water-insoluble copper salts include but are not limited to copper carbonate, copper hydroxide, copper oxychloride, basic copper sulfate, and cuprous oxide. The copper can also be provided as a mixture of two or more water-insoluble copper salts. In general, any water-insoluble copper salt that can be compounded or otherwise blended into a thermoplastic and is effective to promote root branching is included within the scope of the invention as a water-insoluble copper salt. In one embodiment, the concentration of the water-insoluble copper salt in the thermoplastic composition is from about 3 percent to about 25 percent by weight, as Cu, of the thermoplastic composition. In an alternative embodiment the concentration of the water-insoluble copper salt is from about 5 percent to about 20 percent, and in another embodiment from about 7 percent to about 15 percent.

Generally, an effective amount of a water-insoluble copper salt is any amount that promotes the branching of plant roots exposed to the thermoplastic composition. The present invention therefore includes a method of promoting root branching in plants, wherein the roots of a plant are exposed to any substrate that comprises a copper-incorporated thermoplastic composition. Such substrates include but are not limited to plant containers, landscaping fabrics, seedling trays, and plant bags comprising at least in part the thermoplastic composition. Also included are particulate soil conditioners fabricated from the thermoplastic composition and added to soil.

The water-insoluble copper salt as incorporated in the thermoplastic composition functions as a root-branching promoter due to it toxicity to plants and the consequent revulsion of plant roots for the copper. While the invention is described herein largely with regard to the use of water-insoluble copper salts, it is not so limited. Any water-insoluble material which, like the water-insoluble copper salts, has biocidal functionality and is dispersable in the form of a particulate in the thermoplastic composition is included in the scope of the invention. For example, other water-insoluble salts of non-copper metals having known biocidal activity are included. These compounds include but are not limited to water-insoluble salts of zinc, cobalt, manganese, and tin. The water-insoluble metals salts are useful in amount effective to promote root branching, i.e., concentrations that impart promotion of root branching in plants exposed to the thermoplastic composition; these concentrations are similar to those disclosed for the water-insoluble copper salts and would be easily determined without undue experimentation by one of ordinary skill in the art. Also included are water insoluble metal organic compounds useful as biocides.

The thermoplastic composition further contains a water absorptive material. The water absorptive material functions to absorb water and effectively swell, or increase the surface area and volume of, the thermoplastic composition at the surface contacting the plant soil or other growth medium. When the water-insoluble copper salt is incorporated in the thermoplastic, the thermoplastic typically encapsulates the copper salt. Without the presence of the water absorptive material, unless the concentration of the water-insoluble copper salt is very high, typically in excess of about 50% by weight as Cu, the plant roots in contact with the thermoplastic composition will not recognize the copper, and plant containers made therefrom will not effectively promote root branching. To utilize lower concentrations of from about 2 percent to about 25 percent by weight as Cu effectively to promote root branching, the water absorptive material is included in the thermoplastic composition. The water absorptive material at or near the surface of the thermoplastic composition will absorb water in contact with the surface of the thermoplastic composition. This absorbed water expands the water absorptive material, which in turn effectively expands or swells the thermoplastic composition near the surface in contact with the growth medium. The expansion of the thermoplastic composition at or near its surface in contact with the growth medium increases the surface area of the thermoplastic composition, thereby exposing particles of water-insoluble copper salt encapsulated by the thermoplastic composition when not so expanded. The exposed particles of water-insoluble copper salt are thereby available, or recognizable by plant roots coming in contact with the surface of the thermoplastic composition. The plant roots so recognizing the available incorporated water-insoluble copper salt tend, under the influence of the copper, to branch in an advantageous manner. The exposed particles of water-insoluble copper salt and the particles of expanded water-absorptive material are held in place by a matrix of thermoplastic in the thermoplastic composition, thus reducing loss of copper to the soil or growth medium and consequent toxicity to plants.

Suitable water absorptive materials are in the form of a particulate that can be blended with the thermoplastic. Suitable water absorptive materials include but are not limited to corn starch or potato starch or rice starch or other starches, hydroxymethylcellulose or hydroxypropylcellulose or other hydroxycelluloses, wood flour or wood powder or other vegetable fiber, lignosulphonates, and crosslinked polyacrylate carbomers and other synthetic hydrophilic polymers. In general, any particulate material that is water absorptive and can be compounded or otherwise blended in a thermoplastic is suitable and is included within the scope of the invention as a water absorptive material. In one embodiment, the water absorptive material is ammonium lignosulphonate, available as WANNIN AM from Lignotech USA of Bridgewater, N.J. Alternatively, other lignosulphonates including calcium lignosulphonate are suitable as the water absorptive material.

The water absorptive material is present in the thermoplastic composition in a concentration of from about 5 percent to about 40 percent by weight of the thermoplastic composition.

Other metals may optionally be used in the thermoplastic composition, in addition to the water insoluble copper salt. Such metal salts include, but are not limited to, salts of iron, magnesium, calcium, manganese or zinc, and mixtures thereof. These metal salts may be used to buffer the toxicity of the copper and provide a more robust plant. When used, such metals are present in a total amount of between about 1 and about 5 percent by weight of the thermoplastic composition.

The thermoplastic composition provided in accordance with the invention may optionally include a surfactant. The surfactant is useful for increasing the water affinity of the composition. This accelerates the rate at which water is attracted to or picked up by the plastic composition. As a result, the rate at which the copper is available to a plant's roots is increased and consequently, its effectiveness as a root control agent is also increased.

Suitable surfactants are generally nonionic and include, but are not limited to, polyoxyethylene stearic acid, high molecular weight glycols such as polyethylene or polypropylene glycol, poly(oxy-1,2-Ethanediyl)- -(1-oxooctadecyl)- -hydroxy, and mixtures thereof. In a preferred embodiment, polyoxyethylene stearic acid is used. One particularly preferred polyoxyethylene stearic acid is available from Cheinax, Inc of Greenville, S.C. under the tradename E-1750MS/FLK. A particularly preferred poly (oxy-1,2-Ethanediyl)- -(1-oxooctadecyl)- -hydroxy is also available from Chemax under the tradename E-1750MS. The surfactant is used in an amount between about 0.5 and 5% by weight of the plastic composition, advantageously in an amount between about 0.5 and 3% by weight.

Mineral fillers may optionally be used in the copper-incorporated plastic composition provided in accordance with the invention for the purpose of increasing stiffixess and heat distortion and reducing cost. Suitable mineral fillers include, but are not limited to, talc, calcium carbonate, magnesium carbonate, mica, and mixtures thereof. When used, such fillers are present in amounts between about 5 and 50% by weight, advantageously between about 5 and 15%.

Melt viscosity depressants may optionally be used in the composition to reduce frictional heating during processing. Such depressants are used for the purpose of keeping the processing temperature low enough to assure processability of the plastic composition without polymer degradation. Suitable melt viscosity depressants include, but are not limited to mineral oil and are used in an amount between about 0.5 and 10% by weight of the composition, advantageously in an amount between about 0.5 and 3% by weight.

The thermoplastic composition is prepared by preblending all of the components to form a homogeneous mixture. This can be done, for example, in a Hobart mixer. The homogeneous mixture is then charged to a device to fuse the polymers and provide further mixing. This device can be an extruder, a Farrel continuous mixer, a Banbury mixer, a two roll open mill, a low shear twin screw extruder or other device that will heat the polymeric material to its fusion point. If the device is an extruder, it may be a single screw or twin screw extruder of the counter or corotating variety.

It is important that the process of fusing the polymers be accomplished at as low a temperature as possible in order to prevent degradation of the polymeric material by the incorporated copper. In general, the temperature of the melt must be maintained below about 320° F.

The fusion process can be used to produce a pellet that can be further processed into a final shape such as an article, sheet, or film. Alternatively, the fusion process can be used to directly prepare the final product with fusion, mixing, and forming all accomplished in one operation.

In one embodiment, the composition is mixed in two stages to maximize uniformity and minimize polymer degradation. When this is done, the polymers and water absorptive material are mixed and melted first and then the biological or copper-containing package is added in a second stage or mix. This can be accomplished either by using two passes through a hot mixer or by charging the mixer in two stages so that the polymer mixing and melting occurs prior to addition of the copper system.

As an alternative to direct blending of all ingredients, polymer concentrates containing one or more of the other ingredients can be made prior to production of the thermoplastic composition. As an example, the water absorptive material may be blended with polymer and compounded to form pellets containing a high concentration of water absorptive material. Polymer pellets containing about 2 to about 7 times the concentration of water absorptive material desired in the plastic composition may be used. Additionally, water insoluble copper salt may be blended with polymer and compounded to form pellets containing a high concentration of water insoluble copper salt. Polymer pellets containing from about 2 to about 7 times the concentration of water insoluble copper salt desired in the plastic composition may be used. In one embodiment, ethylene vinyl acetate (EVA) pellets containing about 3 times the concentration of calcium lignosulphonate desired in the plastic composition, and low density polyethylene (LDPE) pellets containing about 5 times the concentration of copper carbonate desired in the plastic composition, are blended with the appropriate amounts of LDPE and EVA and other additives directly in a film extruder to produce the plastic composition in film form. As can be seen, many of the ingredients in the copper-containing plastic composition provided in accordance with the invention contain water. This water may be allowed to escape during processing and the processing may be accomplished so that the liberated water is not reabsorbed. This release of water can occur naturally in a Banbury or open mill mixer where volatiles are not restrained.

In processes such as extrusion compounding, water release can be accomplished using a two stage screw having a vented decompression zone after the first stage mixing and melting section. This vent zone is advantageously under vacuum to provide the most efficient dewatering possible.

Furthermore, it is preferable to cool the hot product prior to pelletizing in chilled air or against a chilled surface rather than in a water bath or water spray. The dry pellet may be packaged in containers that are made from low water vapor transmission materials such as aluminum foil coated plastic or sealed metal drums.

Attempts to process product pellet which has reabsorbed water will result in a porous article caused by the transformation of trapped water into steam during processing. However, even wet product may be processed successfully by redrying the pellet in a desiccant type drier at 120° F. for at least 2 hours. Drying may not be necessary if a two stage vacuum vented extruder is employed or processing is done in by an open process such as calendering product fluxed in a Banbury mixer.

Film produced from pellets containing absorbed water exhibits porosity which is good for root branching but very destructive of mechanical properties. To provide a film suitable for root branching and with adequate mechanical properties, the plastic composition may be coextruded with a second polymer to form a laminate. The second polymer is any polymer processable at similar temperatures as the plastic composition, and includes all of those suitable for inclusion in the plastic composition. Generally, the laminate film comprises at least two layers, one of which is the thermoplastic composition. At least one additional layer provides desirable mechanical properties to the laminate. The at least one additional layer may comprise a major weight fraction of the laminate, in excess of 50 percent, and the thermoplastic composition layer may comprise a minor weight fraction of the laminate, less than 50 percent. In one embodiment, a bilayer laminate blown film is produced from the coextrusion of about 30 percent by weight of the plastic composition and about 70 percent by weight of LDPE. The LDPE layer provides good mechanical properties to the film while the plastic composition layer provides the root control properties.

The laminate film may be fabricated into bags which are useful as containers in growing various trees and plants. Alternatively, the laminate film may be used to line plant containers or may be suitably attached to the interior of plant containers by methods including but not limited to sewing, adhesive bonding and heat sealing. A suitably thicker laminate may be extruded as a sheet and then directly thermoformed into plant containers including single plant containers and multiplant containers such as seedling trays. Alternatively, the laminate film can be perforated and cut into sheets which are then used to line seedling trays for growing crops such as rice, or as landscaping fabric in landscaping applications where a root barrier in needed.

The plastic composition provided in accordance with the invention can be used to manufacture plant containers. For example, if the plastic composition is provided in the form of a film obtained by extrusion, blown film techniques, or calendaring, the film can be fabricated into a plant container by processes including folding and/or adhering using sewing, adhesive, or heat seal techniques. Alternatively, the film can be laminated onto another carrier plastic by heat bonding or adhesive means and then stamped or thermoformed to make the final plant container. In still further alternate configurations, plant containers can be manufactured from the plastic composition provided in accordance with the invention by stamping, thermoforming, or fabrication from cut shapes that are bonded together. Plant containers can also be prepared from the copper-incorporated plastic composition by injection molding or blow molding.

The plant containers prepared from the copper-containing plastic composition provided in accordance with the invention are evaluated for their ability to affect root growth by planting seeds in a growing medium contained in the containers. Control seeds are grown in similar plant containers made from plastic materials that do not include incorporated copper. After the plants have grown for a predetermined period of time, the root systems are evaluated and the degree of branching or control is observed. The root systems of the plants grown in the copper-containing plant containers will exhibit a degree of control of greater than about 60%, which is considered to be significant, the root systems of the control plants will exhibit a degree of control of less than 60%.

The following Examples are provided for purposes of illustration only and are not to be construed in a limiting sense.

EXAMPLE 1

Eighty-one (81) parts by weight TONE polycaprolactone polymer, 5 parts by weight copper carbonate, 12 parts by weight corn starch, and 2 parts by weight F-1750MS/FLK polyoxyethylene steanc acid were preblended in a Hobart mixer to produce a homogeneous mixture. The mixture was charged to a Banbury mixer with a room temperature jacket and rotors to fuse the polycaprolactone polymer.

EXAMPLE 2

Seventy-two and two-tenths parts by weight (72.2%) TONE 787 polycaprolactone polymer, 16% by weight KLUCEL EEL hydroxypropylcellulose, 7% copper carbonate, 2% by weight magnesium carbonate, 0.8% by weight iron oxide, and 2% by weight CHEMAX E 1750MS poly(oxy-1,2-Ethanediyl)- -(1-oxooctacecyl)- -hydroxy surfactant were melt blended in a Banbury internal mixer, granulated, and extended into sheets. The sheets were folded into a container and corn seedlings were planted in the container. The container was 60% effective in terminating root growth of the corn seedlings when the roots of the corn seedlings came into contact with the container material.

EXAMPLE 3

Seventy-two and two-tenths parts by weight (72.2%) TONE 767 polycaprolactone polymer, 16% by weight corn starch, 7% copper carbonate, 2% by weight magnesium carbonate, 0.8% by weight iron oxide, and 2% by weight CHEMAX E 1750MS poly(oxy-1,2-Ethanediyl)- -(1-oxooctacecyl)- -hydroxy surfactant were melt blended in a Banbury internal mixer, granulated, and extruded into film sheets using a single screw extruder. The melt flow of this formulation was 8.5 grams per 10 minutes at 125° C. and 2.16 kg. The film sheets were folded into a container and corn seedlings were planted in the container. The container was 77% effective in terminating root growth of the corn seedlings when the roots of the corn seedlings came into contact with the container.

EXAMPLE 4

Thirty-six and one-tenth parts by weight (36.1%) TONE 767 polycaprolactone polymer, 36.1% by weight TONE 787 polycaprolactone polymer, 16% by weight corn starch, 7% copper carbonate, 2% by weight magnesium carbonate, 0.8% by weight iron oxide, and 2% by weight CHEMAX E 1750MS poly(oxy-1,2-Ethanediyl)- -(1-oxooctacecyl)- -hydroxy surfactant were melt blended in a Banbury internal mixer, granulated, and extruded into film sheets using a single screw extruder. The melt flow of this formulation was 1.4 grams per 10 minutes at 125° C. and 2.16 kg. The film sheets were folded into a container and corn seedlings were planted in the container. The container was 77% effective in tenninatlng root growth of the corn seedlings when the roots of the corn seedlings came into contact with the container.

EXAMPLE 5

Eighty-three parts by weight (83%) Millennium ACRYTHENE EM802-120 ethylene methyl acrylate polymer, 12% by weight corn starch, 3% by weight copper carbonate, and 2% by weight CHEMAX B 1750MS poly(oxy-1,2-Ethanediyl)- -(1-oxooctacecyl)- -hydroxy surfactant were melt blended in a Banbury internal mixer, granulated, and extruded into film using a single screw extruder. The film was folded into a container and corn seedlings were planted in the container. The container was 50% effective in terminating root growth of the corn seedlings when the roots of the corn seedlings came into contact with the container.

EXAMPLE 6

Fifty-two and two-tenths parts by weight (52.2%) TONE 787 polycaprolactone polymer, 20% by weight Millennium ACRYTHENE EM 802-120 ethylene methyl acrylate polymer, 16% by weight corn starch, 7% by weight copper carbonate, 2% by weight magnesium carbonate, 0.8% by weight iron oxide, and 2% by weight CHEMAX 2 1750MS poly(oxy-1,2-Ethanediyl)- -(1-oxooctacecyl)- -hydroxy surfactant were melt blended in a Banbury internal mixer, granulated, and extruded into film using a single screw extruder. The film was folded into a container and corn seedlings were planted in the container. The container was 77% effective in terminating root growth of the corn seedlings when the roots of the corn seedlings came into contact with the container.

EXAMPLE 7

Fifty-seven and two-tenths parts by weight (57.2%) TONE 787 polycaprolactone polymer, 15% by weight ENGAGE 8400 low density polyethylene, 16% by weight corn starch, 7% by weight copper carbonate, 2% by weight magnesium carbonate, 0 8% by weight iron oxide, and 2% by weight CHEMAX E 1750MS poly(oxy-1,2-Ethanediyl)- -(1-oxooctacecyl)- -hydroxy surfactant were melt blended in a Banbury internal mixer, granulated, and extruded into film using a single screw extruder. The film was folded into a container and corn seedlings were planted in the container. The container was 83% effective in terminating root growth of the corn seedlings when the roots of the corn seedlings came into contact with the container.

EXAMPLE 8

Sixty-two and two-tenths parts by weight (62.2%) TONE 787 polycaprolactone polymer, 16% by weight corn starch, 10% by weight talc, 7% by weight copper carbonate, 2% by weight magnesium carbonate, 0.8% by weight iron oxide, and 2% by weight CHEMAX E 1750MS poly(oxy-1,2-Ethanediyl)- -(1-oxooctacecyl)- -hydroxy surfactant were melt blended in a Banbury internal mixer, granulated, and extruded into film using a single screw extruder. The film was folded into a container and corn seedlings were planted in the container. The container was 70% effective in terminating root growth of the corn seedlings when the roots of the corn seedlings came into contact with the container.

EXAMPLE 9

Fifty-two and two-tenths parts by weight (52.2%) TONE 787 polycaprolactone polymer, 16% by weight corn starch, 20% by weight American Wood Fibers 4020 pine wood flour, 7% by weight copper carbonate, 2% by weight magnesium carbonate, 0.8% by weight iron oxide, and 2% by weight CHEMAX E 1750MS poly(oxy-1,2-Ethanediyl)- -(1-oxooctacecyl)- -hydroxy surfactant were melt blended in a Banbury internal mixer, granulated, and extruded into film using a single screw extruder. The film was folded into a container and corn seedlings were planted in the container. The container was 80% effective in terminating root growth of the corn seedlings when the roots of the corn seedlings came into contact with the container.

EXAMPLE 10

Eighty-five parts by weight (85%) Millennium ACRYTHENE EM802-120 ethylene methyl acrylate polymer, 12% by weight corn starch, and 3% by weight copper carbonate were melt blended in a Banbury internal mixer, granulated, and extruded into film using a single screw extruder. The film was folded into a container and corn seedlings were planted in the container. The container was 30% effective in terminating root growth of the corn seedlings when the roots of the corn seedlings came into contact with the container.

EXAMPLE 11

Seventy-two and two-tenths parts by weight (72.2%) TONE 787 polycaprolactone polymer, 16% by weight corn starch, 7% by weight copper carbonate, 2% by weight magnesium carbonate, 0.8% by weight iron oxide, and 2% by weight CHEMAX E 1750MS poly(oxy-1,2-Ethanediyl)- -(1-oxooctacecyl)- -hydroxy surfactant were melt blended in a Banbury internal mixer, granulated, and extruded into film using a single screw extruder The melt flow for this formulation was 0.8 grams per 10 minutes at 125° C. and 2.16 kg. The film was folded into a container and corn seedlings were planted in the container. The container was 45% effective in terminating root growth of the corn seedlings when the roots of the corn seedlings came into contact with the container.

EXAMPLE 12

Sixty-eight parts by weight (68%) polycaprolactone polymer, 20% by weight wood powder, 7% by weight copper carbonate. 2% by weight magnesium carbonate, 0.8% by weight iron oxide, and 2% by weight CHEMAX E 1750MS poly(oxy-1,2-Ethanediyl)- -(1-oxooctacecyl)- -hydroxy surfactant were melt blended in a Banbury internal nuxer, granulated, and extruded into film using a single screw extruder. The film was folded into a container and corn seedlings were planted in the container. The container was 60% effective in terminating root growth of the corn seedlings when the roots of the corn seedlings came into contact with the container.

EXAMPLES 13–17

Blends of polycaprolactone, corn starch, and copper carbonate of varying composition were prepared as in the foregoing examples. Plant containers were fabricated from these compositions and seedlings planted in the containers. The effectiveness of these composition in promoting root branching is shown in Table 1.

EXAMPLES 18–22

Blends of ethylene vinyl acetate, ammonium lignosulphonate, and copper carbonate of varying composition were prepared as in the foregoing examples. Plant containers were fabricated from these compositions and seedlings planted in the containers. The effectiveness of these composition in promoting root branching is shown in Table 2.

EXAMPLES 23–26

Blends of ethylene vinyl acetate and copper carbonate of varying composition were prepared as in the foregoing examples. No water absorptive material was added to these blends. Plant containers were fabricated from these compositions and seedlings planted in the containers. The effectiveness of these composition in promoting root branching is shown in Table 3.

TABLE 1

Root Control in Polycaprolactone Composition

| Corn Starch, wt % | Copper Carbonate, wt % | % Root Control (0% = no control) |
|---|---|---|
| 16 | 7 | 53.3 |
| 16 | 12.7 | 65 |
| 16 | 16.4 | 81.7 |
| 16 | 20 | 82.5 |
| 16 | 23.6 | 85 |

EXAMPLE 27

A blend of equal weights of low density polyethylene and ethylene vinyl acetate, 12% by weight of calcium lignosulphonate (Norlig A) and 13% by weight copper carbonate was mixed in a low shear twin screw extruder to form pellets. The pellet was then used as the inner layer of a coextruded blown film where the outer layer was low density polyethylene. The resultant film was fabricated into a bag by heat sealing and the bag was evaluated by growing corn from seed. Control of surface roots was judged to be better than 90%.

TABLE 2

Root Control in Ethylene Vinyl Acetate Composition

| Ammonium Lignosulphonate, wt % | Copper Carbonate, wt % | % Root Control |
|---|---|---|
| 0 | 10 | 13.3 |
| 8 | 10 | 65 |
| 10 | 10 | 86.7 |
| 12 | 10 | 90 |
| 14 | 10 | 93.3 |

TABLE 3

Root Control in Ethylene Vinyl Acetate with no Absorptive Material

| Absorptive Material | Copper Carbonate, wt % | % Root Control |
|---|---|---|
| 0 | 7 | 0 |
| 0 | 8 | 11.7 |
| 0 | 9 | 6.7 |
| 0 | 10 | 13.3 |

It can be seen that useful plastic compositions having incorporated copper are provided in accordance with the invention. The compositions can be processed at temperatures less that about 320° F. and attract water readily. Accordingly, the copper is available to control root growth of plants planted in containers manufactured from these copper-incorporated plastic compositions.

It will thus be seen that the objects set forth above, among those made apparent from the preceding description, are efficiently attained and, since certain changes may be made in the above composition without departing from the spirit and scope of the invention, it is intended that all matter contained in the above description shall be interpreted as illustrative and not in a limiting sense.

It is also understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to included compatible mixtures of such ingredients wherever the sense permits.

What is claimed is:

1. A film laminate for promoting plant root branching, comprising:

a first layer comprising at least one thermoplastic polymer; and a second layer comprising a thermoplastic composition, said thermoplastic composition comprising:
   at least one thermoplastic polymer;
   at least one water-insoluble copper salt present in a concentration of at least 3 percent by weight as copper, based on the weight of the thermoplastic composition; and
   at least one water absorptive material.

2. The film laminate of claim 1, said film laminate being in the form of a bag.

3. The film laminate of claim 1, wherein said film laminate is a perforated sheet.

4. The film laminate of claim 1, wherein said at least one thermoplastic polymer of said first layer is selected from the group consisting of polyethylene, ethylene vinyl acetate, ethylene methyl acrylate, ethylene ethyl acrylate, ethylene butyl acrylate, polycaprolactones, polyvinyl chloride, and polyvinylidene chloride, and said at least one thermoplastic polymer of said second layer is selected from the group consisting of polyethylene, ethylene vinyl acetate, ethylene methyl acrylate, ethylene ethyl acrylate, ethylene butyl acrylate, polyvinyl chloride, and polyvinylidene chloride.

5. The film laminate of claim 1, wherein said at least one water-insoluble biocidal salt is present in a concentration from about 3 to about 25 percent by weight, as metal, based on the weight of the plastic composition.

6. The film laminate of claim 1, wherein said at least one water insoluble biocidal metal salt comprises a member selected from the group consisting of copper carbonate, copper hydroxide, copper oxychloride, basic copper sulfate, and cuprous oxide.

7. The film laminate of claim 1, said at least one water absorptive material being present in a concentration of from about 5 to about 40 percent by weight based on the weight of the plastic composition.

8. The film laminate of claim 1, said at least one water absorptive material comprising a member selected from the group consisting of starches, hydroxycelluloses, wood flours, wood powders, vegetable fibers, lignosulphonates, and synthetic hydrophilic polymers.

9. The film laminate of claim 1, said at least one water absorptive material comprising a lignosulphonate.

10. The film laminate of claim 1, said at least one water absorptive material comprising calcium lignosulphonate.

11. The film laminate of claim 1, said laminate being a sheet thermoformable into a plant container or seedling tray.

12. A plant container fabricated from the film laminate of claim 1.

13. The film laminate of claim 1, wherein said at least one thermoplastic polymer of said thermoplastic composition is selected from the group consisting of polyethylene, ethylene vinyl acetate, ethylene methyl acrylate, ethylene ethyl acrylate, ethylene butyl acrylate, polycaprolactones, polyvinyl chloride, and polyvinylidene chloride.

14. The film laminate of claim 1, wherein said second layer is a minor weight fraction of said laminate.

15. The film laminate of claim 1, wherein said laminate comprises at least one additional layer.

16. The film laminate of claim 1, wherein said at least one water absorptive material comprises ammonium lignosulphonate.

17. The film laminate of claim 1, wherein said at least one thermoplastic polymer is processable at a temperature of less than 350° F.

18. The film laminate of claim 1, wherein said first layer is coextruded with said second layer.

19. The film laminate of claim 1, wherein said at least one thermoplastic polymer of said thermoplastic composition is selected from the group consisting of polyethylene, ethylene vinyl acetate, and ethylene methyl acrylate.

20. The film laminate of claim 1, wherein said at least one thermoplastic polymer of said thermoplastic composition comprises polyethylene and ethylene vinyl acetate.

21. The film laminate of claim 1, wherein said at least one thermoplastic polymer of said thermoplastic composition comprises polyethylene and ethylene methyl acrylate.

22. The film laminate of claim 1, wherein said thermoplastic composition further comprises a surfactant.

* * * * *